Patented July 28, 1942

2,291,082

UNITED STATES PATENT OFFICE 2,291,082

TITANIUM DIOXIDE PIGMENT

Joseph M. Jarmus, East Orange, and Walter W. Plechner, Metuchen, N. J., assignors to National Lead Company, New York, N. Y., a corporation of New Jersey No Drawing. Application May 13, 1939, Serial No. 273,516

14 Claims. (Cl. 106—300)

This invention relates to methods for improving certain properties of titanium dioxide pigments. These properties are resistance to chalking and gloss retention.

Among the objects of the present invention are titanium dioxide pigments possessing a reduced tendency to chalk and an enhanced tendency toward retention of gloss of surface coating films incorporating the pigments of the invention.

Titanium dioxide pigments, particularly the relatively pure titanium dioxide, $TiO_2$, but also including the so-called "composite" titanium dioxide pigments, in which titanium dioxide is intimately and uniformly associated with an extender pigment, e. g., barium sulfate, calcium sulfate or the like, although highly desirable from point of view of tinting strength and hiding power properties, nevertheless leave something to be desired from point of view of chalking and gloss retention. The present invention constitutes a simple and effective means for the preparation of titanium dioxide pigments having improved resistance to chalking and enhanced gloss retention and is equally applicable to the preparation of composite titanium dioxide pigments as to the preparation of pure titanium dioxide.

According to the present invention a previously prepared titanium dioxide pigment is treated with a poly-substituted organic derivative of phthalic acid. The treatment should preferably be effected in such manner as to coat the individual pigment particles and one convenient method for so treating the pigment particles will be subsequently described herein.

The poly-substituted organic derivatives of phthalic acid include both alkyl- and aryl-esters of phthalic acid, among which the dimethyl-, diethyl-, dibutyl-, and diphenylphthalates are particularly useful in the practice of the present invention. For the improved effects of the present invention it does not matter whether the phthalic acid ester employed is a solid, e. g., diphenylphthalate, M. P. 69–70°; or a liquid, e. g., dimethyl-, diethyl-, and dibutylphthalates, which are high-boiling liquids.

The preferred and most convenient method for treating the pigment particles consists in dissolving the phthalic acid ester in a suitable, preferably low boiling organic solvent of the nature of alcohol, ether, benzol and the like; it being understood, of course, that one will employ a solvent in which the phthalic acid ester is readily soluble. The pigment to be treated is now intimately mixed, as by vigorous agitation, with the solution of phthalic acid ester. The solvent is next removed by evaporation, preferably by distillation under reduced pressure in order to effect an economical recovery of solvent. The so-treated pigment when dried and pulverized is ready for use.

In certain instances it may be desirable to effect a dispersion of the pigment in the phthalic acid ester solution by means of a dispersing agent. For instance, if the solvent be an alcohol or ketone, tannic acid will act to disperse the pigment in the solution. The choice of a suitable dispersing agent will depend upon the nature of the medium. In certain instances the phthalic acid ester may itself act as a dispersing agent. Dispersion by means of a dispersing agent is desirably employed when the pigment to be treated is in an aggregated condition, that is, contains a large portion of aggregates made up of several individual primary particles.

However, it is obvious that resort may be had to direct mixing of the titanium pigment and the phthalic acid ester. Thus, the solid phthalic acid esters may be thoroughly mixed with the pigment in ribbon or tumbler type mixers; the liquid esters may be sprayed onto the pigment while conveying in a screw-type conveyor or in a mixer. Mechanical means of effecting intimater mixtures of pigments with small amounts of reagents are well-known and need not be further discussed here.

The proportion of phthalic acid ester which gives the improved properties lies between about 0.25 percent and 5 percent, preferably within the narrow range of about 0.5 percent and about 2.5 percent, the calculation of quantity being based upon the weight of the pigment to be treated.

The following table illustrates the improved results of the invention. The results embodied below were obtained by exposing test panels to outdoor weathering conditions at a 45° angle facing south on test fences located at Sayville, Long Island. The results given were obtained after 21 days of exposure.

| | | Chalking | Loss of gloss |
|---|---|---|---|
| A | Untreated $TiO_2$ pigments | Considerable | Considerable. |
| B | Untreated $TiO_2$ pigments +0.5% diphenylphthalate. | Very, very slight | Very slight. |
| C | Untreated $TiO_2$ pigments +1.0% dimethylphthalate. | do | Do. |
| D | Untreated $TiO_2$ pigments +1.0% diethylphthalate. | do | Do. |
| E | Untreated $TiO_2$ pigments +1.0% dibutylphthalate. | Very slight | Slight. |

The results are expressed in the relative terms; no absolute means for evaluating chalk resistance having yet been devised.

The pigments treated according to the present invention are useful wherever surface coated compositions containing them are to be exposed to outdoor weathering conditions.

By the term "intimate and uniformly mixing" as used in the claims appended hereto, we mean to include the suspension of pigment particles in solutions of phthalic acid esters followed by the removal of the solvent, the dry mixing of the phthalic acid ester with the pigment particles as well as the spraying of liquid phthalic acid ester onto the pigment particles.

The foregoing description of our invention has been given for clearness of understanding and no undue limitations should be deduced therefrom, but the appended claims should be interpreted as broadly as possible in view of the prior art.

We claim:

1. The process of preparing a substantially dry titanium dioxide pigment having improved chalking resistance and gloss retention which comprises intimately and uniformly mixing the particles of a previously prepared titanium dioxide pigment with an amount of a poly-substituted organic derivative of phthalic acid insufficient to adversely affect the flowing properties thereof.

2. The process of preparing a substantially dry titanium dioxide pigment having improved chalking resistance and gloss retention which comprises intimately and uniformly mixing the particles of a previously prepared titanium dioxide pigment with an amount of an alkyl ester of phthalic acid insufficient to adversely affect the flowing properties thereof.

3. The process of preparing a substantially dry titanium dioxide pigment having improved chalking resistance and gloss retention which comprises intimately and uniformly mixing the particles of a previously prepared titanium dioxide pigment with an amount of an aryl ester of phthalic acid insufficient to adversely affect the flowing properties thereof.

4. The process of preparing a substantially dry titanium dioxide pigment having improved chalking resistance and gloss retention which comprises intimately and uniformly mixing the particles of a previously prepared titanium dioxide pigment with a poly-substituted organic derivative of phthalic acid in an amount between about 0.25 percent and about 5 percent, based upon the weight of the titanium dioxide pigment.

5. The process of preparing a substantially dry titanium dioxide pigment having improved chalking resistance and gloss retention which comprises intimately and uniformly mixing the particles of a previously prepared titanium dioxide pigment with a poly-substituted organic derivative of phthalic acid in an amount between about 0.5 percent and about 2.5 percent, based upon the weight of the titanium dioxide pigment.

6. The process of preparing a substantially dry titanium dioxide pigment having improved chalking resistance and gloss retention which comprises suspending particles of a titanium dioxide pigment in a solution of a poly-substituted organic derivative of phthalic acid and a low boiling organic solvent, the said poly-substituted organic derivative of phthalic acid being present in an amount between about 0.25 percent and about 5 percent based upon the weight of the titanium dioxide pigment, removing the solvent by evaporation and drying and pulverizing the titanium dioxide pigment.

7. The process of preparing a substantially dry titanium dioxide pigment having improved chalking resistance and gloss retention which comprises suspending particles of a titanium dioxide pigment in a solution of a poly-substituted organic derivative of phthalic acid and a low boiling organic solvent, dispersing the pigment particles therein by means of a dispersing agent, removing the solvent by evaporation and drying and pulverizing the titanium dioxide pigment.

8. The process of preparing a substantially dry titanium dioxide pigment having improved chalking resistance and gloss retention which comprises spraying a liquid phthalic acid ester onto the particles of the titanium dioxide pigment.

9. The process of preparing a substantially dry titanium dioxide pigment having improved chalking resistance and gloss retention which comprises dry-mixing a phthalic acid ester with the particles of the titanium dioxide pigment.

10. The process according to claim 1 in which the pigment is a composite pigment of titanium dioxide and an extender pigment.

11. Process according to claim 1 in which the pigment is a composite pigment of titanium dioxide intimately associated with barium sulphate.

12. Process according to claim 1 in which the pigment is a composite pigment of titanium dioxide intimately associated with calcium sulphate.

13. As a new product a substantially dry titanium dioxide pigment having improved chalking resistance and gloss retention, having intimately associated therewith a poly-substituted organic derivative of phthalic acid in an amount between about 0.25 percent and about 5 percent, based upon the weight of the titanium dioxide pigment.

14. As a new product a substantially dry composite pigment of titanium dioxide and an extender having improved chalking resistance and gloss retention and having intimately associated therewith a poly-substituted organic derivative of phthalic acid in an amount between about 0.25 percent and about 5 percent, based upon the weight of the composite pigment.

JOSEPH M. JARMUS.
WALTER W. PLECHNER.